US011054300B2

(12) United States Patent
Zehnder et al.

(10) Patent No.: US 11,054,300 B2
(45) Date of Patent: Jul. 6, 2021

(54) WEIGHING DEVICE WITH A MOVABLE MOUNTING UNIT

(71) Applicant: Mettler-Toledo GmbH, Greifensee (CH)

(72) Inventors: Marc Zehnder, Uster (CH); Louis Caglioni, Oberwil (CH); Rino Bilger, Busswil (CH)

(73) Assignee: Mettler-Toledo GmbH, Greifensee (CH)

( * ) Notice: Subject to any disclaimer, the term of this patent is extended or adjusted under 35 U.S.C. 154(b) by 64 days.

(21) Appl. No.: 16/432,157

(22) Filed: Jun. 5, 2019

(65) Prior Publication Data
US 2019/0376836 A1  Dec. 12, 2019

(30) Foreign Application Priority Data
Jun. 7, 2018  (EP) .................................... 18176615

(51) Int. Cl.
*G01G 21/28* (2006.01)
*G01G 21/22* (2006.01)
(52) U.S. Cl.
CPC ........... *G01G 21/286* (2013.01); *G01G 21/22* (2013.01)
(58) Field of Classification Search
CPC .............................. G01G 21/22; G01G 21/286
See application file for complete search history.

(56) References Cited

U.S. PATENT DOCUMENTS

| 4,700,793 | A  | * | 10/1987 | Luchinger | G01G 21/286 |
| | | | | | 177/181 |
| 4,789,034 | A  | * | 12/1988 | Luchinger | G01G 21/283 |
| | | | | | 177/181 |
| 6,246,018 | B1 | * | 6/2001 | Schink | G01G 21/286 |
| | | | | | 177/180 |
| 6,557,391 | B2 | * | 5/2003 | Luchinger | G01G 21/22 |
| | | | | | 73/1.13 |
| 6,603,081 | B2 | | 8/2003 | Lüchinger | |
| 6,835,901 | B2 | | 12/2004 | Lüchinger | |
| 7,012,198 | B2 | * | 3/2006 | Ludi | G01G 21/28 |
| | | | | | 177/187 |
| 7,227,087 | B2 | * | 6/2007 | Luechinger | G01G 21/22 |
| | | | | | 177/180 |
| 7,227,088 | B2 | * | 6/2007 | Luechinger | G01G 21/286 |
| | | | | | 177/180 |

(Continued)

*Primary Examiner* — Natalie Huls
(74) *Attorney, Agent, or Firm* — Standley Law Group LLP; Jeffrey S. Standley; Stephen L. Grant

(57) ABSTRACT

A weighing device (10) has a base body (11), a weighing chamber floor (15), a weighing chamber rear wall (25), and a draft shield (20). The draft shield has a top wall (23), a first side wall (22L), a second side wall (22R), and a front wall (24). The weighing chamber floor, the weighing chamber rear wall, and the draft shield act together to enclose a weighing chamber (W). The weighing chamber rear wall has a first side (35) facing the draft shield and a second side (36), opposite the first side. A mounting unit (30) is movably connected to the first side of the weighing chamber rear wall and a position control unit (50) is operatively connected thereto, on the second side of the weighing chamber rear wall. An elongate slot (40) that passes through the rear wall receives the mounting unit about the first side and guides the mounting unit in a direction normal to the base body.

10 Claims, 14 Drawing Sheets

(56) References Cited

U.S. PATENT DOCUMENTS

| | | | | |
|---|---|---|---|---|
| 7,633,018 | B2* | 12/2009 | Leisinger | G01G 23/3735 177/25.13 |
| 8,299,375 | B2* | 10/2012 | Luchinger | G01G 21/286 177/180 |
| 9,121,749 | B2* | 9/2015 | Izumo | G01G 21/28 |
| 9,574,932 | B2* | 2/2017 | Weber | G01G 21/286 |
| 2002/0040814 | A1* | 4/2002 | Luchinger | G01G 21/286 177/180 |
| 2011/0286886 | A1* | 11/2011 | Luchinger | G01G 21/00 422/68.1 |
| 2015/0204716 | A1* | 7/2015 | Lewandowski | E05F 15/632 177/180 |
| 2019/0316954 | A1* | 10/2019 | Buchmann | G01G 21/286 |
| 2019/0316955 | A1* | 10/2019 | Buchmann | G01G 21/286 |
| 2019/0316956 | A1* | 10/2019 | Buchmann | G01G 21/286 |
| 2020/0284642 | A1* | 9/2020 | Zehnder | G01G 13/003 |
| 2020/0284645 | A1* | 9/2020 | Zehnder | G01G 13/24 |

* cited by examiner

WEIGHING DEVICE WITH A MOVABLE MOUNTING UNIT

CROSS-REFERENCE TO RELATED APPLICATIONS

This application makes a claim of priority to European Patent Application No. 18176615.5, filed on 7 Jun. 2018, which is incorporated by reference as if fully recited herein.

TECHNICAL FIELD

The invention relates to a force measuring device and more particularly to a weighing device provided with a movable mounting unit adapted to carry a plurality of replaceable accessories. The weighing device of the present invention is typically used to weigh small objects with a very high precision. The sensitivity that enables a weighing device to measure weight so precisely also makes the balance susceptible to any air circulation in the area of the weighing pan. The weighing pan and the space around it are therefore separated from the ambient environment by an enclosure that is commonly referred to as a draft shield. These weighing devices are employed for example in chemical and pharmaceutical laboratories, industrial quality control, the jewellery trade, numismatics, weighing of air-pollution filters, and many other applications.

BACKGROUND ART

A weighing device, more specifically a laboratory weighing device, is used for measuring the weight of samples. In another application, a predefined quantity of a material is dosed into a target container for carrying out downstream chemical analyses. Several applications exist surrounding the principle of force measurement and hence there is a need for making the weighing device more versatile. The weighing device serves as a platform for a variety of applications. This is accomplished by initiating necessary design changes in legacy devices in order to successfully integrate application devices with the weighing device. The applications so far discussed broadly fall under two categories: applications that leverage the force measuring principle and applications that do not leverage the force measuring principle. Most prominent applications that involve weighing are liquid dosing, powder dosing, analytical weighing, differential weighing, sample preparation, formulation, density determination, interval weighing, pipette calibration, and formula weighing. Some exemplary applications that fall into the second category are illuminating, indicating, displaying, temperature sensing, pH measurement etc.

In a prior art arrangement in U.S. Pat. No. 8,299,375, there is disclosed a weighing balance with a dosage-dispensing device attached to it. The dosage-dispensing device slides vertically over the rear wall. The top cover of the draft protection device is connected to the dosage-dispensing device such that a portion of the draft protection device or the complete draft protection device moves vertically when the dosage-dispensing device moves.

One of the main objects of the present invention is to provide a weighing device comprising a weighing chamber that is well protected from external influences such as ambient air draft leading quickly to a stable weighing result. Furthermore, the weighing chamber should have a simple design. Another objective of the present invention is to provide a weighing device, which can be used for various applications.

SUMMARY

These objectives are achieved by a weighing device in accordance with the independent claim. Advantageous embodiments and detail features of the invention are set forth in the dependent claims.

The inventive weighing device comprising a base body, a weighing chamber floor, a weighing chamber rear wall, and a draft shield with a top wall, a first side wall, a second side wall, and a front wall, wherein the weighing chamber floor, the weighing chamber rear wall, and the draft shield together enclose a weighing chamber (W). The weighing chamber rear wall comprising a first side and a second side with the first side facing the draft shield and the second side located opposing the first side. The weighing device further comprising a mounting unit movably connected to the first side of the weighing chamber rear wall, and a position control unit operatively connected to the mounting unit and located on the second side and the weighing chamber rear wall comprising an elongate slot for receiving the mounting unit about the first side and guiding the mounting unit in a direction normal to the base body.

The inventive weighing device is capable of receiving and weighing a sample. In its operative configuration, the weighing device rests on a levelled surface such as a working bench. The weighing device comprises a base body to which a plurality of ground engaging members are attached. The ground engaging members are physically in contact with the levelled surface on which the weighing device rests. The weighing device comprises a weighing pan for receiving and weighing sample containers of varying sizes, shapes, and weights. The weighing pan receives and supports the weight of the sample and transfers the received weight to a transducer in a known way. There is also provided a weighing chamber floor that is located above the base body and below the weighing pan. The weighing device further comprises a draft shield having at least a pair of side walls, a top wall, and a front wall. The draft shield acts as a protective structure covering four sides surrounding the weighing pan.

The weighing device further comprises a weighing chamber rear wall. The weighing chamber rear wall is connected to the base body and the base body supports the draft shield. The weighing chamber rear wall is arranged normal to the base body. The draft shield along with the weighing chamber floor and the weighing chamber rear wall surrounds the weighing pan thereby shielding the weighing pan and the sample container placed on it from the undesirable effects of ambient current. In one aspect of the invention, the two side walls are arranged facing one another and the top wall is located at a distance above and away from the base body. The weighing chamber rear wall further comprises a first side and a second side. The draft shield and the weighing chamber rear wall are located facing each other and more particularly the first side of the weighing chamber rear wall is positioned facing the draft shield. The draft shield comprising the two side walls, the top wall, and the front wall together with the weighing chamber rear wall and the weighing chamber floor form the weighing chamber.

The weighing device further comprises a mounting unit movably connected to the weighing chamber rear wall. It is envisaged to allow the mounting unit to slide along the first side of the weighing chamber rear wall.

In an advantageous design the mounting unit is configured and adapted to receive and carry a variety and/or plurality of replaceable accessories such as for example the top wall of the draft shield, dispensing devices, dosing devices, display devices, illuminating devices, sensing devices and/or ionizer.

In an advantageous design, the top wall comprises an opening for accessing the weighing chamber through the top wall. The opening in the top wall is configured to cooperate with the dosing device. This opening advantageously conducts a metered sample dispensed from the dosing device into the sample container located inside the weighing chamber.

In a preferred embodiment, it is envisaged to provide an elongate slot that is long enough to allow the mounting unit to traverse at least one-third length of the weighing chamber rear wall.

Advantageously, the elongate slot is covered by a longitudinal strip. The strip may be made of metallic or polymeric material. Ideally, the slot is completely covered by the longitudinal stip. The width of the longitudinal strip is wide enough to substantially cover the elongate slot. Ideally, the longitudinal strip is wide enough to completely cover the elongate slot. Such an arrangement serves to further separate the position control unit from the weighing pan. The position control unit is located in the weighing chamber wall. The longitudinal strip effectively shields the position control unit as well as a multitude of other sensitive components located behind the weighing chamber rear wall and in the housing from contamination. The longitudinal strip can also be described as cover strap, cover ribbon or cover belt.

In one inventive embodiment, the longitudinal strip is tautly secured to the weighing chamber rear wall and the mounting unit is slidably connected to the longitudinal strip such that the longitudinal strip fully covers the elongate slot at all positions of the mounting unit. The longitudinal strip covering the elongate slot is routed through the mounting unit. The mounting unit thus, is in sliding contact with the longitudinal strip. The longitudinal strip is taut and secured to the weighing chamber rear wall through a pair of retainers located on the second side of the weighing chamber rear wall.

In another inventive embodiment, the top wall is connected to the mounting unit and adapted to be moved in a direction normal to the base body in vertical direction.

Preferably, the top wall is located below the mounting unit and they are moved together along the elongate slot of the weighing chamber rear wall. As the top wall moves with the moving mounting unit, the volume of the weighing chamber can be varied to suit a given laboratory application. This has the advantage that the volume of the draft shield is adaptable to the size of a weighing sample in a fast and efficient way. The smaller volume of the draft shield leading to less air currents and stable weighing results can be achieved quickly.

In connection with varying the volume of the weighing chamber by moving the top wall of the draft shield in normal direction, a position sensing device is provided thereof. The position sensing device is in wired or wireless communication with the position control unit. The position sensing device senses at least a dimensional parameter, such as height, of the sample container received on the weighing pan. Ideally, the position sensing device measures the distance to a sample positioned on the weighing pan. The position of the top wall can be adapted according to the measured height. In other applications, an accessory, e.g. a dosing device, can be positioned at the right height to enable spillage free dosing into the sample container. The position sensing device is located at one of the advantageous locations on the weighing device. Few such advantageous locations are the top wall, the mounting unit, the weighing chamber rear wall, and the weighing chamber floor. The position sensing device can be one of an optical sensor, sonic sensor, capacitive sensor, or inductive sensor.

The position control unit is operatively connected to the mounting unit. The position control unit enables the transfer of force to the mounting unit and aids in its movement along the first side of the weighing chamber rear wall. In one embodiment, the position control unit comprises a clutch element that applies a force of friction on the mounting unit thereby holding it in its position on the weighing chamber rear wall and preventing it from sliding along the weighing chamber rear wall under gravity when no external force is applied.

In an alternative embodiment, the position control unit comprises a motor unit such that the drive from the motor unit is transferred to the mounting unit. The motor unit provides the necessary motive force to displace the mounting unit in a direction normal to the base body.

In a preferred way, the motor unit is located in the weighing chamber rear wall.

BRIEF DESCRIPTION OF THE DRAWINGS

The laboratory balance with the weighing chamber weighing chamber rear wall according to the invention will be described hereinafter through embodiments shown schematically in the drawings, wherein identical parts are identified by identical reference numbers and wherein.

DETAILED DESCRIPTION

The invention will be described in detail with specific reference to an embodiment shown in FIGS. 1 to 14C.

Figure 1:
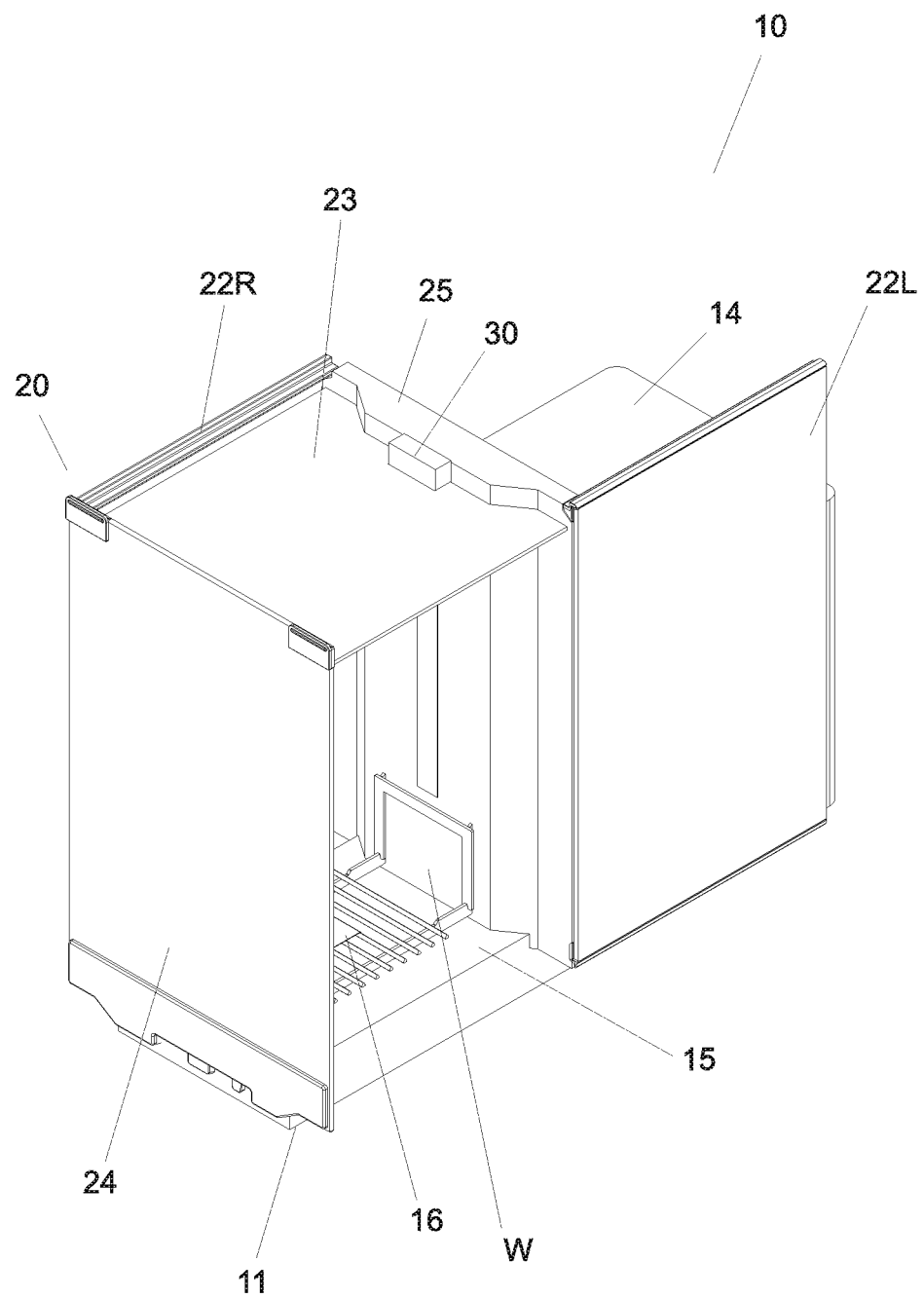
FIG. 1 illustrates a schematic representation of a weighing device comprising a manually operated mounting unit.

Referring to FIG. 1, there is shown a schematic representation of a weighing device 10 comprising a base body 11, a plurality of ground engaging members (not shown), a housing 14, a weighing chamber floor 15, a weighing pan 16, a draft shield 20, a weighing chamber rear wall 25 and an mounting unit 30. A load cell and the electronic components required e.g. to process the weighing signals are located in the housing 14. The terminal displaying e.g. the weighing result is not shown in FIG. 1. The draft shield 20 together with the weighing chamber floor 15 and the weighing chamber rear wall 25 form a weighing chamber W. The draft shield 20 further comprises a pair of side walls 22L and 22R, a top wall 23, and a front wall 24. The mounting unit 30 is modularly configured to carry a plurality of replaceable accessories (not indicated) each aimed at serving a specific purpose in the course of handling samples. An exemplary accessory is a dosing device that is used for dispensing a metered sample into a sample receiver.

Figure 2:
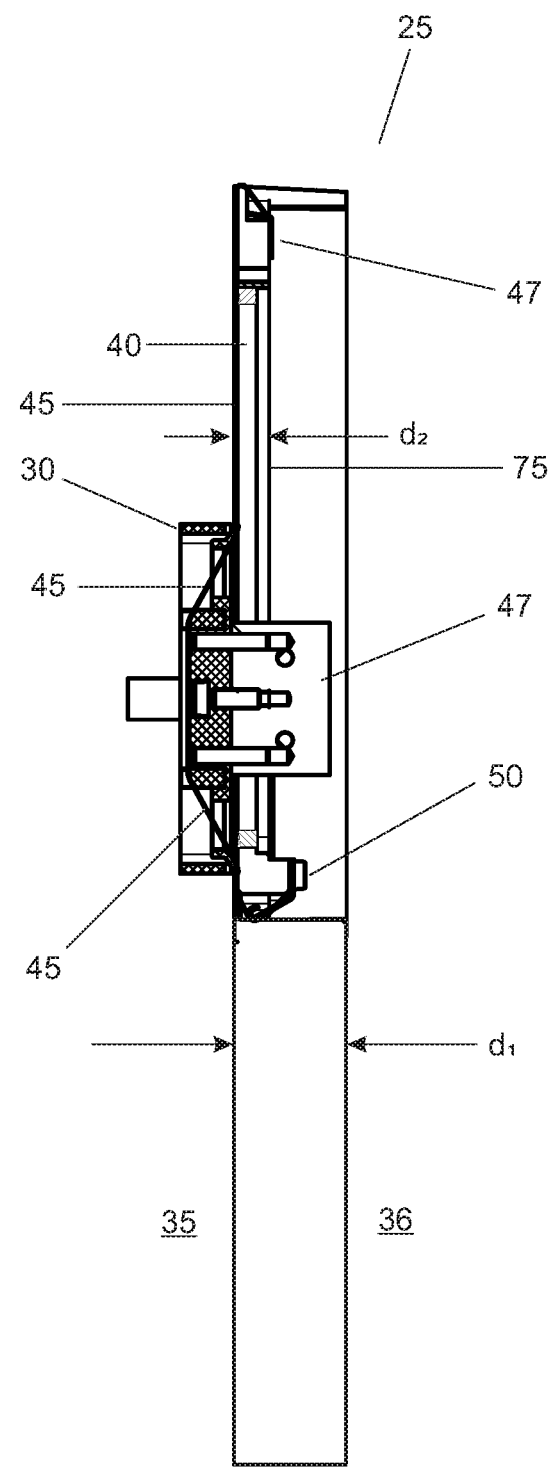
FIG. 2 illustrates a side cross-sectional view of weighing chamber rear wall of the weighing device.

Further details of the instant invention will be delineated with specific reference to FIG. 2 of the drawings. FIG. 2 illustrates a side cross-sectional view of the weighing chamber rear wall 25 of the weighing device 10. Weighing chamber rear wall 25 comprises a first side 35 and a second side 36. The first side 35 is facing towards the weighing chamber and the second side is facing towards the inside of the housing 14. The weighing chamber rear wall 25 further comprises an elongate slot 40, a longitudinal strip 45, a pair of retainers 47, and a position control unit 50.

Figure 3:
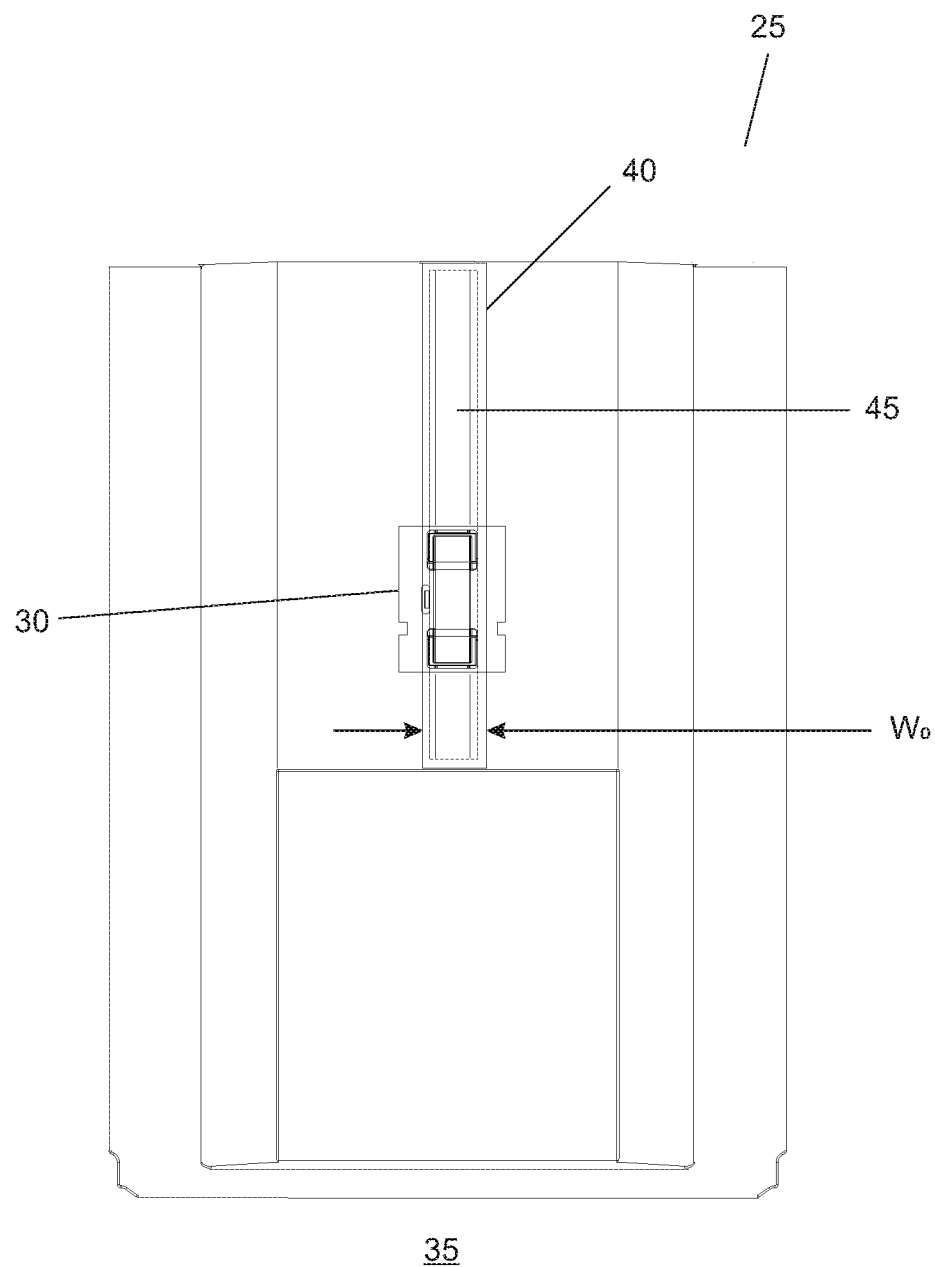
FIG. 3 illustrates a schematic front view of weighing chamber rear wall along with the mounting unit and the longitudinal strip.
Figure 4:
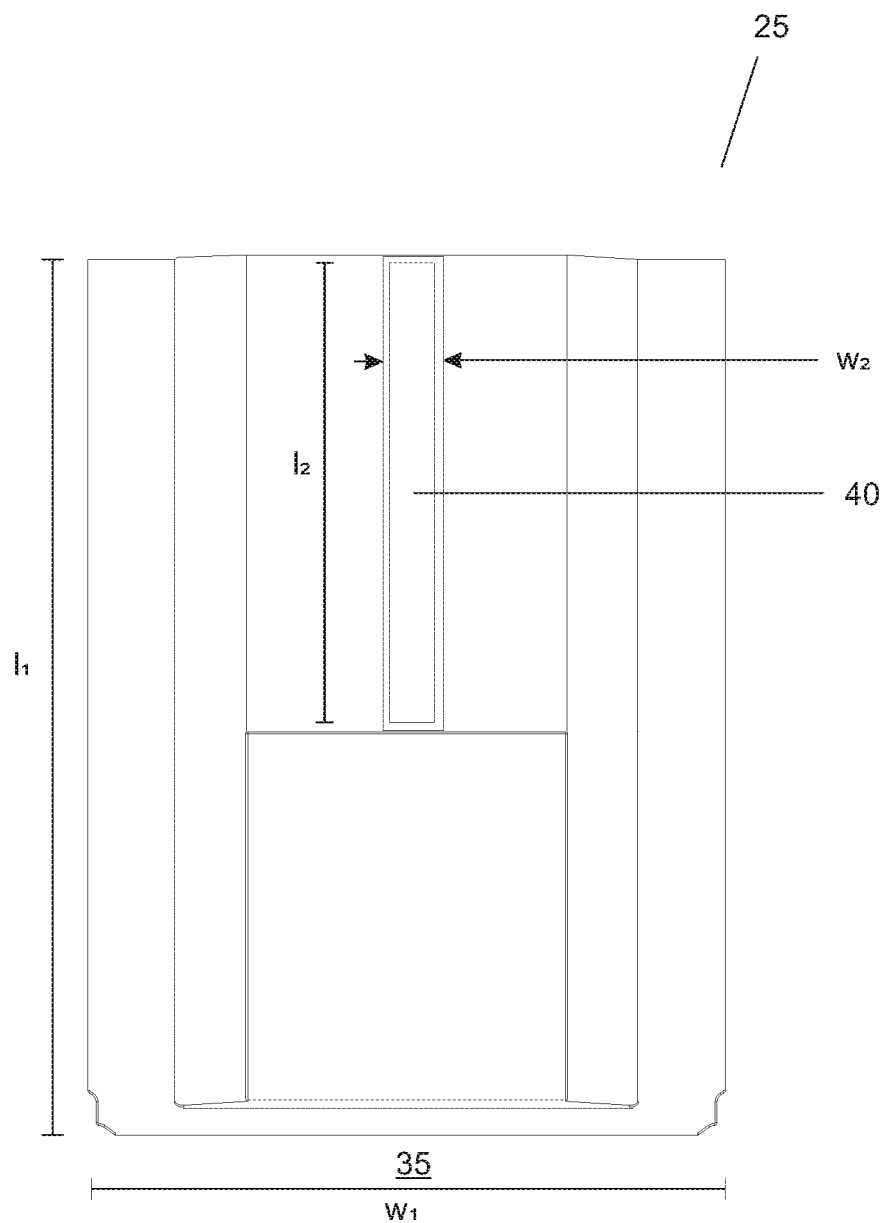
FIG. 4 illustrates a weighing chamber rear wall with an elongate slot specifically highlighting the configuration and size of the elongate slot in comparison to the weighing chamber rear wall.

Reference is now made to FIGS. 3 and 4 where FIG. 3 illustrates a schematic front view of weighing chamber rear wall 25 comprising a mounting unit 30 and longitudinal strip 45 on the first side 35. FIG. 4 illustrates a weighing chamber rear wall 25 without the mounting unit 30 showing the elongate slot 40 extending from the first side 35 on to the second side 36 in the longitudinal direction.

Figure 5:
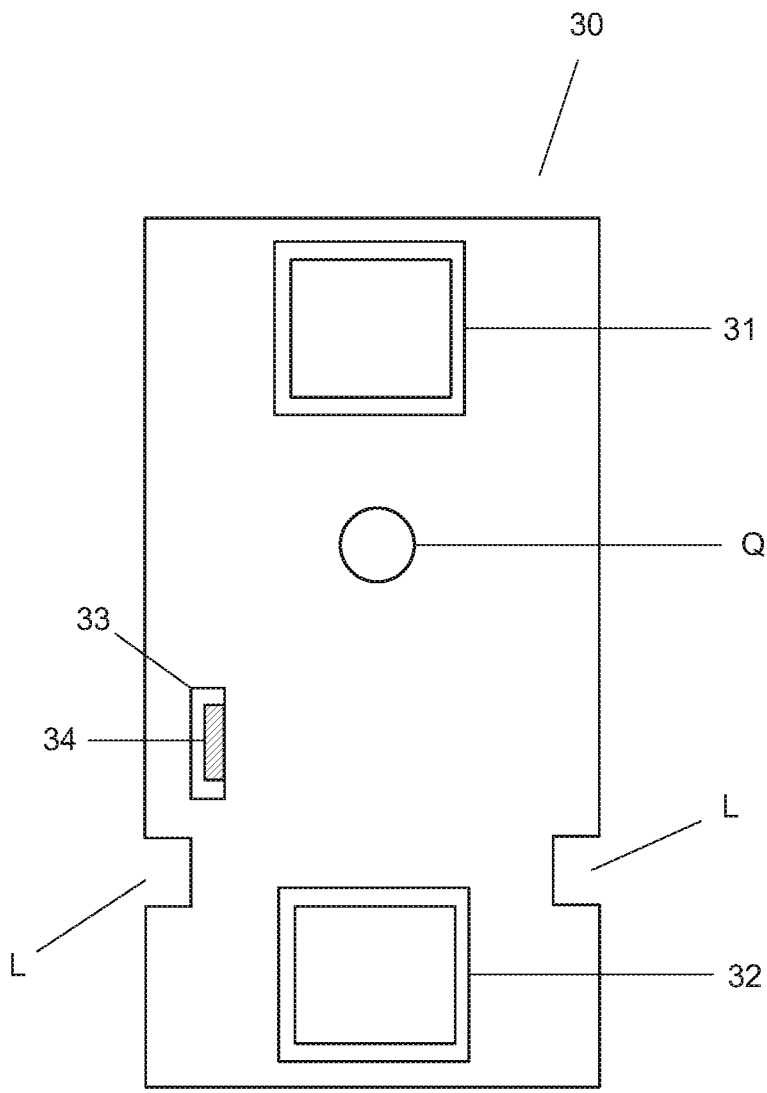
FIG. 5 illustrates a front view of a mounting unit showing its various components.
Figure 6:
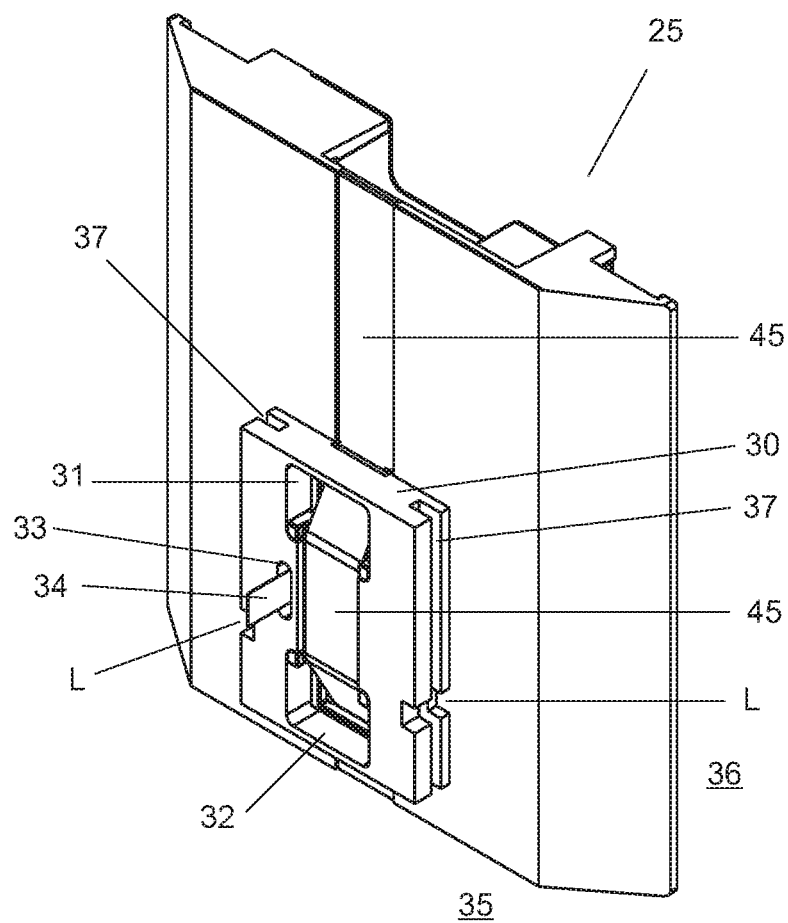
FIG. 6 illustrates a front perspective view of the mounting unit movably connected to a portion of the weighing chamber rear wall.

Reference is now made to FIGS. 5 and 6 that further illustrate the mounting unit 30 and the weighing chamber rear wall 25 in detail. The mounting unit 30 assumes a substantially rectangular configuration and comprises an upper routing window 31, a lower routing window 32, a passage 33, an opening Q, and a pair of locking portions L. The mounting unit 30 also comprises a pair of grooves 37 located opposing each other and extending longitudinally along the outer most ends of the mounting unit 30. The passage 33 receives and routes a connecter 34.

Figure 7:
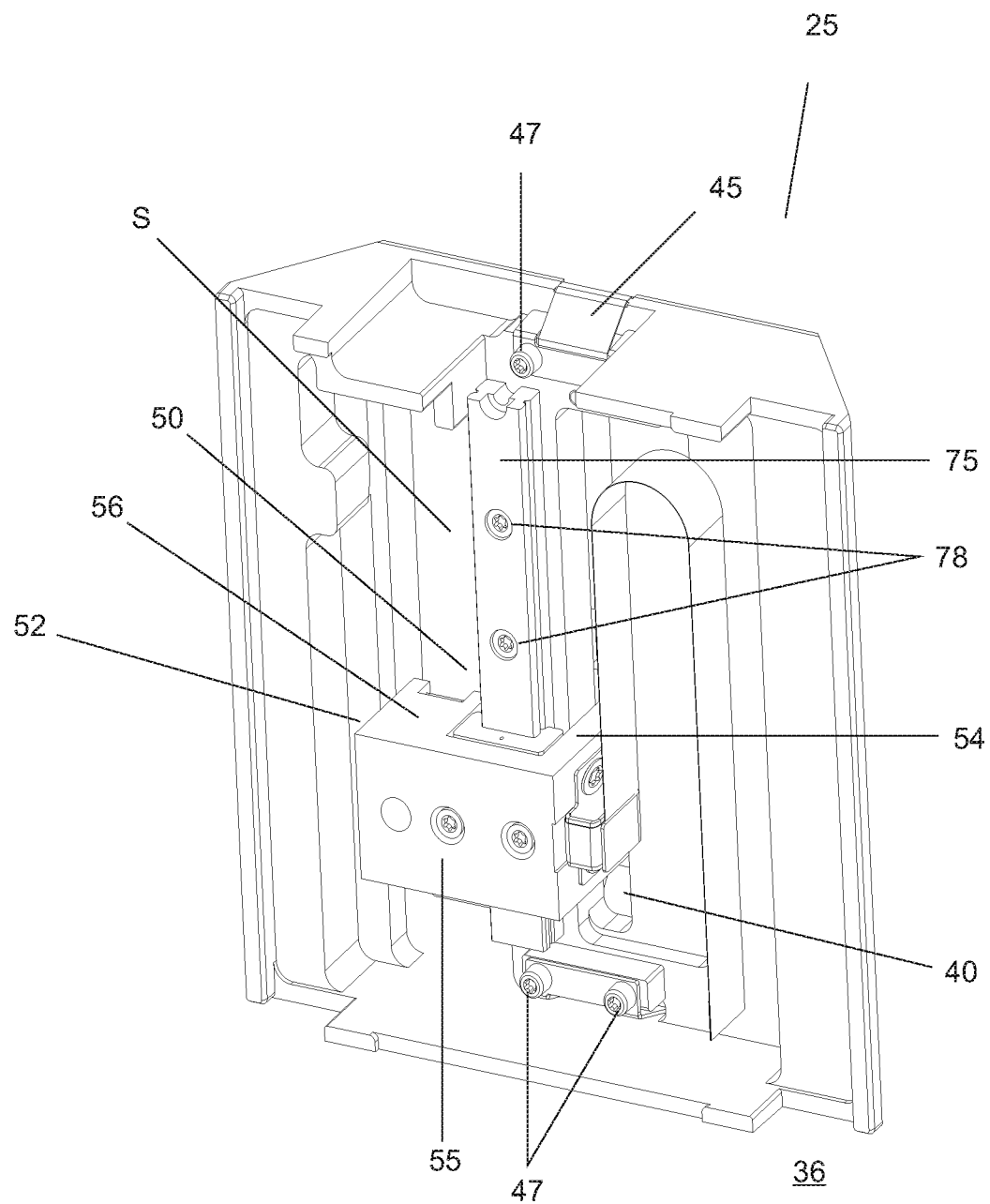
FIG. 7 is a perspective view of the weighing chamber rear wall as seen from the second side, which houses the position control unit.
Figure 8:
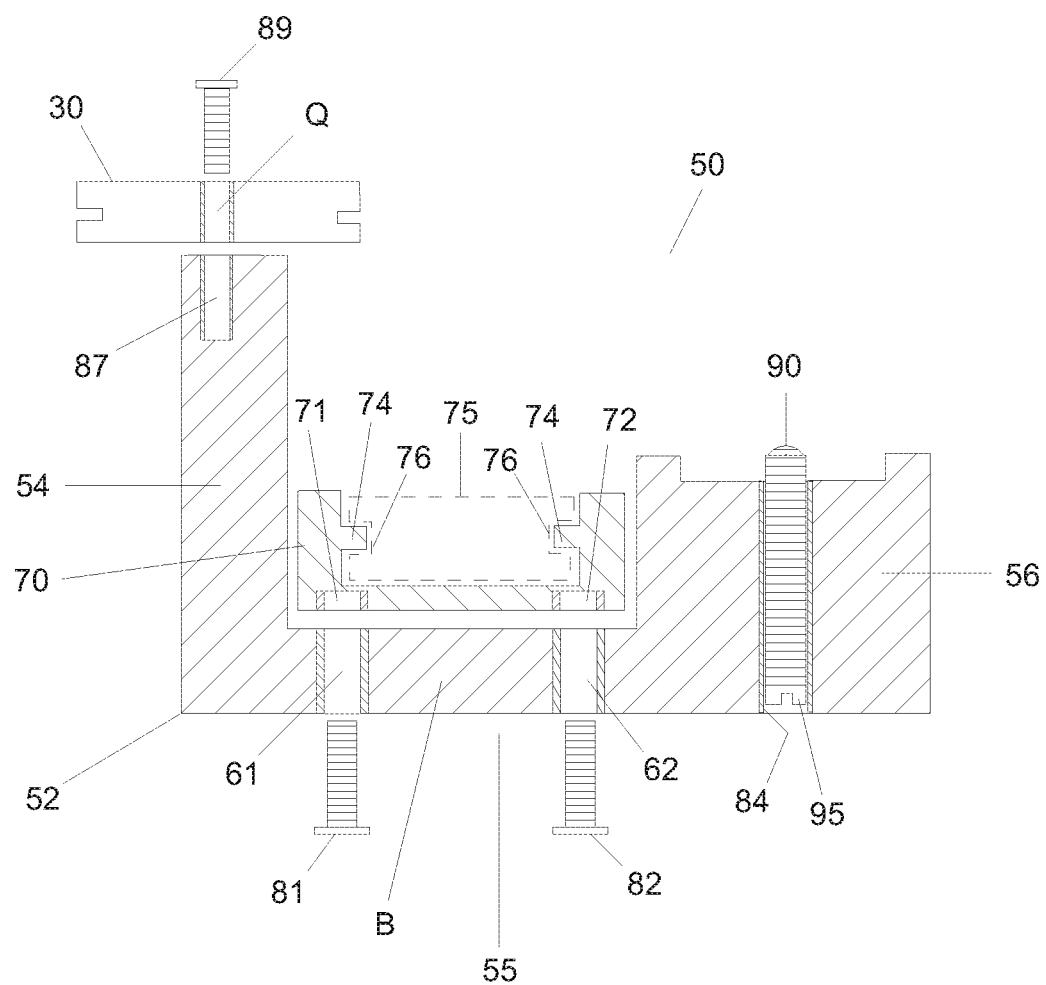
FIG. 8 is a sectional view of the position control unit mounted on the second side of the weighing chamber rear wall in a weighing device.

FIG. 7 illustrates a perspective view of the second side 36 of the weighing chamber rear wall 25. The second side 36 houses the position control unit 50 and provides the contacting surface S. There is also provided a retainer 47. The position control unit 50 comprises a carrier 52, and a guide rail 75. Further constructional details about the position control unit 50 will hereinafter be explained with specific reference to FIG. 8. The carrier 52 comprises a first arm 54, a base 55 and a second arm 56. There is also provided a bridge B. The bridge B is provided with a pair of threaded through bores 61 and 62 configured to receive fasteners 81 and 82. The first arm 54, the second arm 56 and the bridge B are integrally formed. The position control unit 50 further comprises a guide 70. The guide 70 comprises a pair of threaded bores 71 and 72 each configured to receive fasteners 81 and 82. There are also provided a pair of splines 74, 74 extending inwardly facing each other. The guide rail 75 is provided with a pair of longitudinally extending grooves 76, 76. The first arm 54 comprises a threaded through bore 87 configured to receive a fastener 89. The second arm 56 of the carrier 52 is provided with a threaded through bore 84. There is also provided a clutch element 90 along with an adjuster 95 both of which are received within the through bore 84. The clutch element 90 is adapted to interact with the contacting surface S.

The interrelationship among various components used in the current embodiment to implement and realize the benefits of the advantageous invention will hereinafter be described with reference once again to FIGS. 1 to 8. The base body 11 forms the foundation on which all the other components of the weighing device 10 rest. The housing 14 supported by the base body 11 forms the posterior portion of the weighing device 10. The housing 14 accommodates sensitive electronics that warrant strict isolation from the sample to be weighed, without which the functioning and precision of the weighing device 10 will be compromised. The draft shield 20 forms part of the anterior portion of the weighing device 10. The anterior and posterior portions of the weighing device 10 are designated from the standpoint of the operator entrusted with operating the weighing device 10. While operating the weighing device 10, the operator stands near the anterior portion of the weighing device 10 facing the draft shield 20. The weighing pan 16 forming part of the anterior portion of the weighing device 10 is located right above the weighing chamber floor 15. The weighing pan 16 is configured to receive and support the sample container (not shown). The weighing pan 16 transfers the received weight of the sample to a transducer (not shown) that generates a signal indicative of the weight of the sample in a known way. Additional details relating to the constitution and interconnectedness of the weighing pan 16 with the other components of the weighing device 10 are beyond the scope of this invention. The draft shield 20 with its two side walls 22R and 22L, top wall 23, front wall 24 along with the weighing chamber floor 15 and weighing chamber rear wall 25 assumes a box like configuration forming a weighing chamber W.

Further constructional details of the draft shield 20 will be explained with specific reference to FIG. 1. The side walls 22R and 22L of the draft shield 20 are secured to the base body 11 and the walls 22R and 22L are disposed facing each other thereby shielding the sample container (not shown) placed on the weighing pan 16 from side ward drafts. The top wall 23 with an opening P is positioned above the weighing pan 16 and serves to protect the weighing pan 16 from the effect of upward drafts. The opening P serves to conduct the sample delivered by a replaceable (not indicated) into the target sample container (not shown) placed on the weighing pan 16. In the current embodiment, the top wall 23 is secured to the mounting unit 30. More particularly, the top wall 23 is located below the mounting unit 30. The front wall 24 and the weighing chamber rear wall 25 are secured normal to the base body 11 and are disposed facing each other. It is advantageous to use side walls 22R and 22L, top wall 23, and front wall 24 made of diaphanous material so as to allow the operator of the weighing device 10 to visually inspect the weighing or dispensing operation. It is envisaged to allow the side walls 22R, 22L, top wall 23, and front wall 24 movable so as to make the weighing chamber W easily accessible to the operator handling the sample.

Further aspects of the instant embodiment will be explained in detail by referring once again to FIGS. 2-4. The weighing chamber rear wall 25 is secured to the base body 11 and abuts the housing 14. The anterior and the posterior portions of the weighing device 10 are parted by the weighing chamber rear wall 25 sandwiched in between. It is advantageous to use a high performance, load-enduring material for the manufacture of weighing chamber rear wall 25 to allow it to withstand the stresses induced due to relative motion and vibration. In the present embodiment, the weighing chamber rear wall 25 is of a rectangular configuration with dimensions of length $l_1$, width $w_1$, and depth $d_1$. The first side 35 of the weighing chamber rear wall 25 is positioned facing the front wall 24 of the draft shield 20 whereas the second side 36 of the weighing chamber rear wall 25 is positioned facing the housing 14.

The elongate slot 40 provided in the weighing chamber rear wall 25 is of a rectangular configuration with dimensions of length $l_2$, width $w_2$, and depth $d_2$. It is envisaged to provide an elongate slot 40 whose length $l_2$ is at least one third of the length $l_1$ of the weighing chamber rear wall 25. The functional aspects surrounding the dimensions of the elongate slot 40 will be explained in detail separately in the later part of this specification. It is also pertinent to note that the width $w_2$ and depth $d_2$ of the elongate slot 40 are substantially lesser than the width $w_1$ and depth $d_1$ of the weighing chamber rear wall 25.

The mounting unit 30 of the weighing device 10 is movably connected to the weighing chamber rear wall 25. More particularly, the elongate slot 40 is configured to receive the mounting unit 30 and to dispose it in a sliding relationship with the first side 35 of the weighing chamber rear wall 25. The longitudinal strip 45 is configured to closely match the dimensions of the elongate slot 40 of the weighing chamber rear wall 25. The width $w_0$ of the longitudinal strip 45 is substantially the same as the width $w_2$ of the elongate slot 40 to ensure proper sealing of the elongate slot 40. The longitudinal strip 45 is firmly taut essentially fully covering the elongate slot 40 and secured to the weighing chamber rear wall 25 by at least a pair of retainers 47 each located at the lower most end and upper most end of the elongate slot on the second side 36. The longitudinal strip 45 effectively minimizes the exposure of sensitive electronics located inside the housing 14 to samples received within the weighing chamber W for weighing. While benign samples do not readily cause damage to the sensitive electronics located inside the housing 14, samples that are of hazardous, deteriorative, deleterious, and corrosive nature will quickly cause an irreversible damage to sensitive electronics thereby rendering the weighing device 10 inoperative.

Referring once again to FIGS. 5-7, the mounting unit 30 disposed on the first side 35 of the weighing chamber rear wall 25 is connected to the position control unit 50. It is envisaged to connect the mounting unit 30 to the position control unit 50 by means of a fastener 89 passing through the opening Q. The upper routing window 31 and the lower routing window 32 are through openings of rectangular geometry. The longitudinal strip 45 covering the elongate slot 40 is routed through the mounting unit 30. More specifically, the longitudinal strip 45 is routed through the upper routing window 31 and passed over the opening Q covering the fastener 89 and then routed through the lower routing window 32. The arrangement of mounting unit 30 and the longitudinal strip 45 hitherto described will become more lucid when read in conjunction with FIGS. 5 and 6.

Further functional aspects pertaining to the mounting unit 30 will be explained once again by referring to FIG. 6. The mounting unit 30 is configured and adapted to receive and carry a host of replaceable accessories (not indicated) such as the top wall, dispensing devices, dosing devices, display devices, illuminating devices, sensing devices etc. Particularly, the grooves 37 located opposing each other and extending longitudinally along the outer most ends of the mounting unit 30 aids in attaching a multitude of replaceable accessories (not indicated) each customized to perform a specific function. There is also provided a locking portion L on the outer most ends of the mounting unit 30 intercepting the grooves 37. The locking portion L in the instant embodiment is a U-shaped slot formed by removing the material from the outer most ends of the mounting unit 30 interrupting the groove 37. The replaceable (not indicated) is envisaged to contain a pair of inwardly splined portions (not shown) that readily mate with the grooves 37. The replaceable (not indicated) is envisaged to also contain a pair of inwardly biased locking tabs (not shown) that readily plunge into the locking portion L as the splined portions (not shown) gradually advance along the grooves 37 so as to hold the replaceable (not indicated) firmly against the mounting unit 30.

Passage 33, shown in FIGS. 5 and 6, is a through opening of ovoid configuration and is provided for routing the connector 34 originating from the second side 36 on to the first side 35 through the elongate slot 40. The connector 34 is an electrical cable for carrying power to a replaceable (not indicated). The connector 34 can also be a data cable that exchanges data packets between an electronic controller (not shown) and a replaceable (not indicated). Advancements in wireless communication and power storage technologies may render the passage 33 and the connector 34 dispensable. For example, a battery powered—Wi-Fi enabled replaceable (not indicated) does not require an external power source as well as a data cable respectively.

Hereinafter, further functional and operational aspects pertaining to the position control unit 50 will be described in detail by referring once again to FIGS. 7 and 8. The position control unit 50 is suitably connected to the weighing chamber rear wall 25 at two different locations i.e. on the first side 35 and on the second side 36 of the weighing chamber rear wall 25. Firstly, the position control unit 50 is fastened to the mounting unit 30 by means of a fastener 89. The fastener 89 passes through the opening Q provided on the mounting unit 30 and then enters the elongate slot 40 and is finally received in the threaded bore 87 provided on the first arm 54 of the position control unit 50. Secondly, the position control unit 50 is fastened to the second side 36 of the weighing chamber rear wall 25 by using a pair of fasteners 81 and 82. More specifically, the carrier 52 of the position control unit 50 is fastened to the guide 70 by allowing the fasteners 81 and 82 to pass through the threaded bores 61 and 62 respectively provided on the bridge B whereby the fasteners 81 and 82 are configured to terminate inside the threaded bores 71 and 72 provided on guide 70. The inwardly extending splines 74, 74 of guide 70 are perfectly received and locked inside the grooves 76, 76 of the guide rail 75. The guide rail 75 is in turn attached to the second side 36 of the weighing chamber rear wall 25 using fasteners 78. The second arm 56 comprising threaded bore 84 is configured to receive the clutch element 90. The clutch element 90 comprises a threaded pin with a semispherical end. The clutch element 90 further comprising an adjuster 95 is located on the other end opposing the semispherical end. The semispherical end of the clutch element 90 operatively interacts with the contacting surface S provided on the second side 36 of the weighing chamber rear wall 25. The extent of frictional force induced by the clutch element 90 on the contacting surface S may be varied by operating the adjuster 95. In the present embodiment, the adjuster 95 is configured to be rotated in clockwise and counter clock-wise directions in order to increase and decrease respectively the frictional force acting on the contacting surface S. It is pertinent to note that the position control unit 50 of the present embodiment is designed to be operated manually.

The manufacturing process adopted for realizing the aforementioned embodiment will hereinafter be outlined so as to enable a person of ordinary skill in the art to practice the invention without necessitating undue experimentation. The weighing chamber rear wall 25 can be molded or die casted. The elongate slot 40 is formed while molding or die casting the weighing chamber rear wall 25. Alternatively, the elongate slot 40 may be formed by removing the material from already formed weighing chamber rear wall 25 with no cut portions. One or more material removing techniques may be adopted to form the elongate slot 40 in the weighing chamber rear wall 25. An exemplary yet non-exhaustive list of techniques is turning, drilling, welding, and laser cutting. The length $l_2$ of the elongate slot 40 directly influences the vertical displacement of the mounting unit 30. The width $w_2$ of the elongate slot 40 is so designed to allow the fastener 89 to pass through. Alternatively, the width $w_2$ is configured to match the size of the first arm 54. In case the weighing device 10 is leveraged for liquid dosing or gravimetric dosing, the length $l_2$ of the elongate slot 40 is relatively smaller than that is needed for powder dosing. The guide rail 75 is attached to the weighing chamber rear wall 25 on the second side 36 either by fastening or by adopting any other suitable technique such as welding. The guide 70 is connected to the guide rail 75 by inserting the splines 74 into the grooves 76 such that the guide 70 glides along the guide rail 75 in a fixed direction. The interlocking of the splines 74 against the grooves 76 ensures movement of the guide 70 only in the vertical direction and restricts the movement of the guide 70 in the fore-aft direction. The carrier 52 is aligned properly relative to the slot 40 by passing the first arm 54 through the elongate slot 40. The carrier 52 is now connected to the guide 70 by aligning and joining the threaded bores 61, 62 with the threaded bores 71, 72 using fasteners 81, 82 correspondingly, thus forming the position control unit 50. The mounting unit 30 is joined to the position control unit 50 by means of a fastener 89 passing through the opening Q and terminating in the threaded bore 87. The clutch element 90 is driven through the threaded bore 84 until the semispherical end of the clutch element 90 emerges from the other side of the threaded bore 84 and establishes a contact with the contacting surface S. The frictional force acting on the contacting surface S is set and fine-tuned by operating the adjuster 95. One end of the longitudinal strip 45 is fixed to the weighing chamber rear wall 25 by means of a retainer 47 provided on the upper end of the second side 36. The free end of the longitudinal strip 45 is inserted from the rear and routed through the fore of the upper routing window 31 and guided on to the surface of the mounting unit 30 so as to sufficiently cover fastener 89 joining the mounting unit 30 and the position control unit 50. The free end of the longitudinal strip 45 is then inserted through the fore and routed through the rear of the lower routing window 32. The free end of the longitudinal strip 45 emerging from the rear of the lower routing window 32 is sufficiently taut and fixed to the weighing chamber rear wall 25 by means of another retainer 47 provided on the lower end of the second side 36. The weighing chamber rear wall 25 carrying the mounting unit 30 thus formed can be suitably attached to the other components necessary for making the weighing device 10 work.

Hereinafter, a manner of working the invention will be explained in detail with reference once again to FIGS. 1 to 8. A replaceable (not indicated) such as a dispensing device, dosing device, display device, illuminating device, sensing device etc., is attached to the mounting unit 30 by inserting and gliding the inwardly splined portions (not shown) of the replaceable (not indicated) along the grooves 37 till the inwardly biased locking tabs (not shown) plunge into the locking portion L successively locking the replaceable (not indicated) and the mounting unit 30. To render more specificity to the ongoing description, the replaceable in the instant embodiment is a dosing device. A target sample container (not shown) for receiving the sample dispensed by the dosing device is placed in the weighing chamber W and more particularly over the weighing pan 16 located above the weighing chamber floor 15. Once the target sample container (not shown) is surrounded by the draft shield 20, the position of the mounting unit 30 is vertically adjusted (raised or lowered) depending on the dimensional parameters such as height of the target container (not shown). More specifically, the operator has to apply a predetermined amount of normal force on the mounting unit 30 so as to overcome or release the force of friction induced by the clutch element 90 on the contacting surface S such that the mounting unit 30 along with the dosing device is movable along the elongate slot 40 of the weighing chamber rear wall 25. As the operator stops applying the normal force, the clutch element 90 once again locks the mounting unit 30 in its new position on the weighing chamber rear wall 25. The dosing device attached to the mounting unit 30 is then operated for carrying out a dosing operation.

Figure 9:
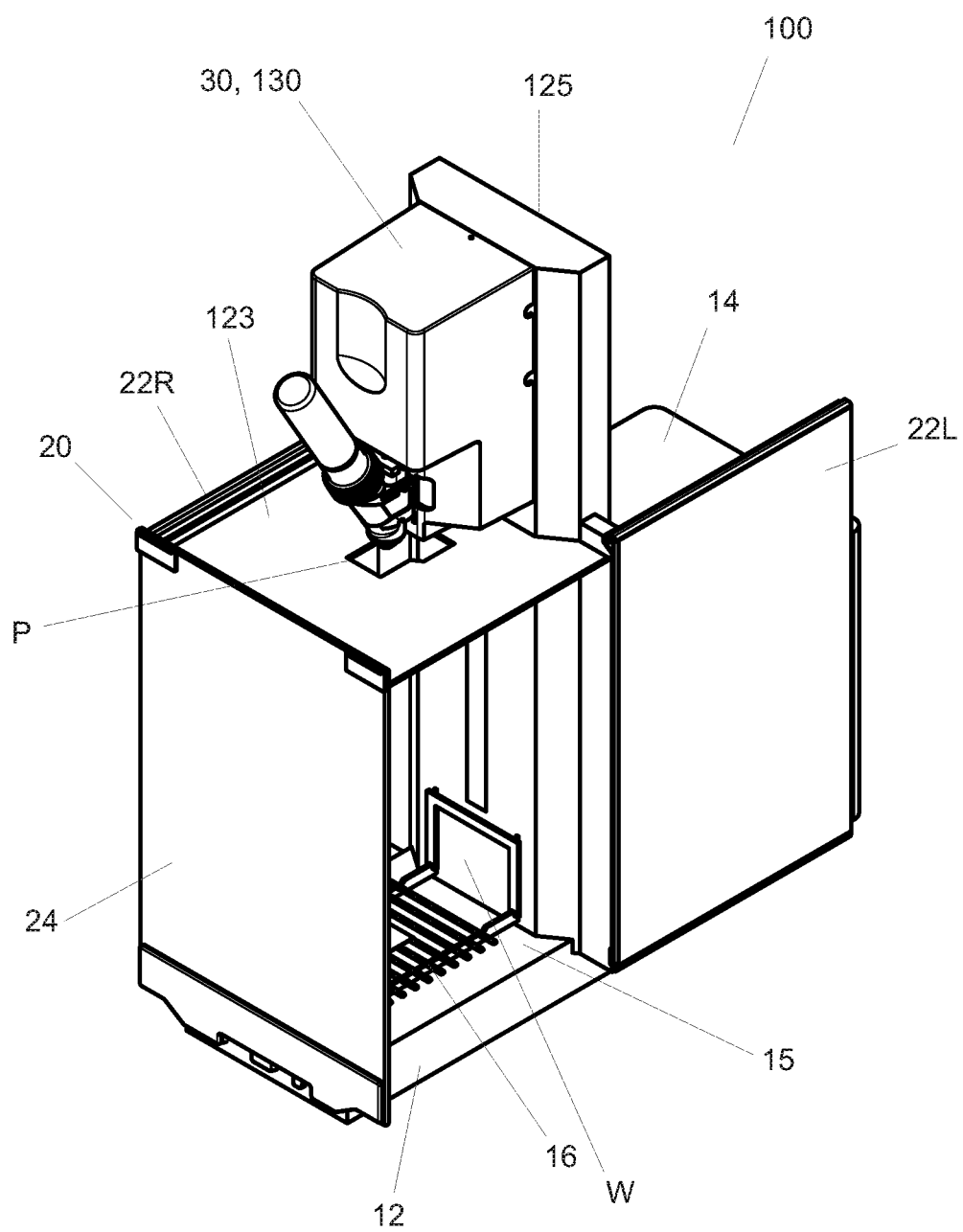
FIG. 9 illustrates a schematic representation of a weighing device comprising a motorized mounting unit carrying a dosing device.
Figure 10:
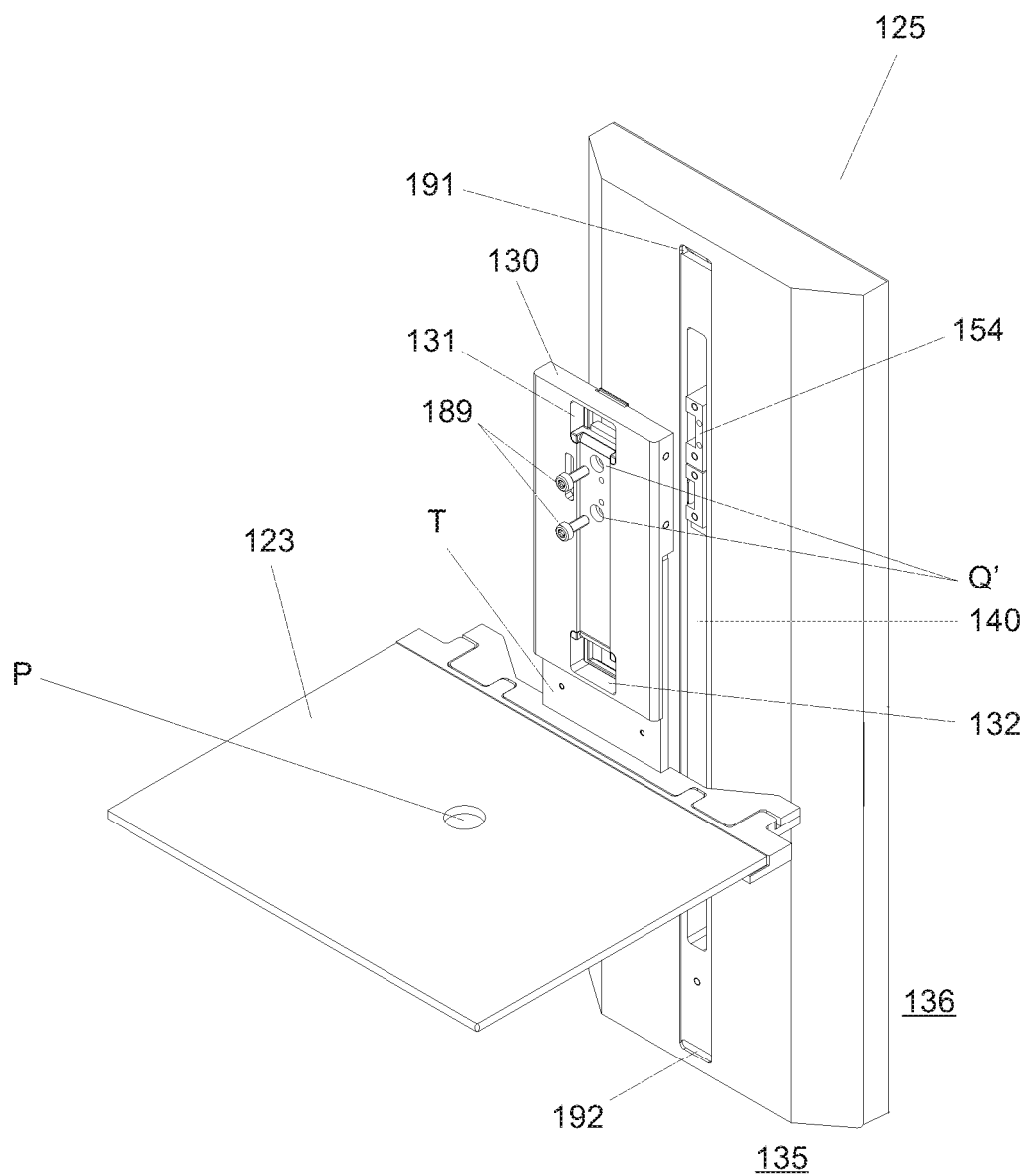
FIG. 10 illustrates a front perspective view of the weighing chamber rear wall along with the top wall of the draft shield connected to an mounting unit without the dosing device.
Figure 11:
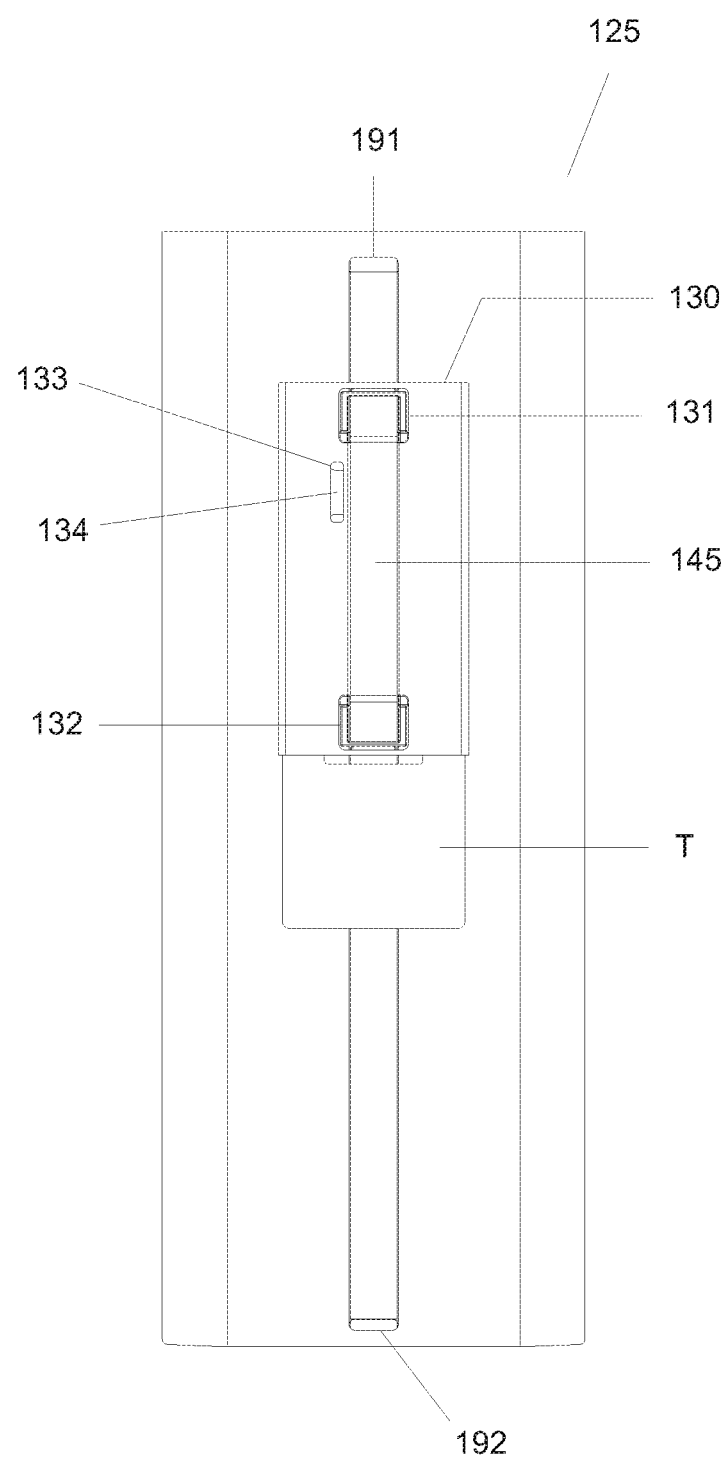
FIG. 11 illustrates a front view of the weighing chamber rear wall and mounting unit as envisaged in the alternative embodiment.
Figure 12:
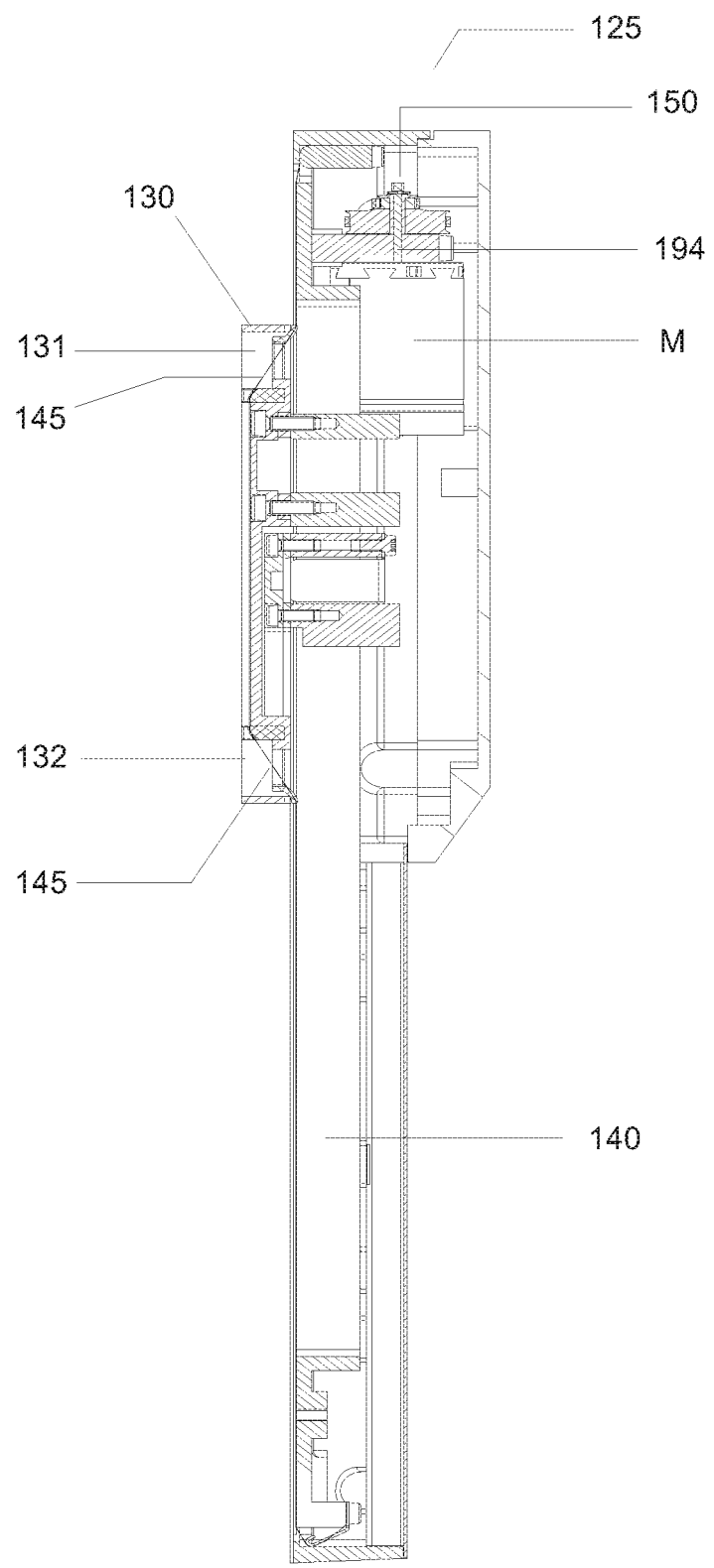
FIG. 12 illustrates a side cross-sectional view of the weighing chamber rear wall showing the arrangement of position control unit as envisaged in the alternative embodiment.

Hereinafter, an alternative arrangement embodying the same inventive principle hitherto explained will be described in detail. FIG. 9 shows a weighing device 100 having a motorized mounting unit 130. Referring to FIGS. 10 and 11, there is provided a top wall 123, a weighing chamber rear wall 125, a mounting unit 130 and a longitudinal strip 145. The top wall 123 of the draft shield 20 contains at least an opening P. The weighing chamber rear wall 125 comprises a first side 135 and a second side 136. The weighing chamber rear wall 125 further comprises an elongate slot 140 extending through the first side 135 on to the second side 136 in the longitudinal direction. It is pertinent to note that the elongate slot 140 of the alternative embodiment as shown in FIGS. 10 and 11 is longer than the elongate slot 40 of the foregoing embodiment as shown in FIGS. 3 and 4. The weighing chamber rear wall 125 also comprises an upper passage 191 and a lower passage 192 located above and below the elongate slot 140 respectively. The mounting unit 130 comprises an upper routing window 131, a lower routing window 132. The mounting unit 130 further comprises a plurality of through openings Q' for receiving fasteners 189. The fasteners 189 join the mounting unit 130 to the position control unit 150 (FIG. 12). More specifically, the mounting 130 is connected to the first arm 154 of the position control unit 150. There is also provided a bracket T attached to and extending below the mounting unit 130. The top wall 123 is mounted on the bracket T.

The mounting unit 130 of the weighing device 100 is movably connected to the weighing chamber rear wall 125. More particularly, the elongate slot 140 is configured to receive the mounting unit 130 so as to dispose the mounting unit 130 in a sliding relationship with the first side 135 of the weighing chamber rear wall 125. The longitudinal strip 145 is configured to closely match the dimensions of the elongate slot 140 of the weighing chamber rear wall 125. The width of the longitudinal strip 145 is substantially the same as that of the elongate slot 140 to ensure proper sealing of the elongate slot 140. One end of the longitudinal strip 145 is firmly fixed on the second side 136 of the weighing chamber rear wall 125 by using a retainer (not shown) and then routed through the upper passage 191, upper routing window 131, lower routing window 132 covering the openings Q' and the fastener 189, and then finally routed through the lower passage 192. The longitudinal strip 145 is firmly taut fully covering the elongate slot 140 and secured to the weighing chamber rear wall 125 on the second side 136 by another retainer (not shown) located below the elongate slot 140.

The mounting unit 130 further comprises a through hole for electrical contact 133 with an electrical contact including communication module 134.

Figure 13:
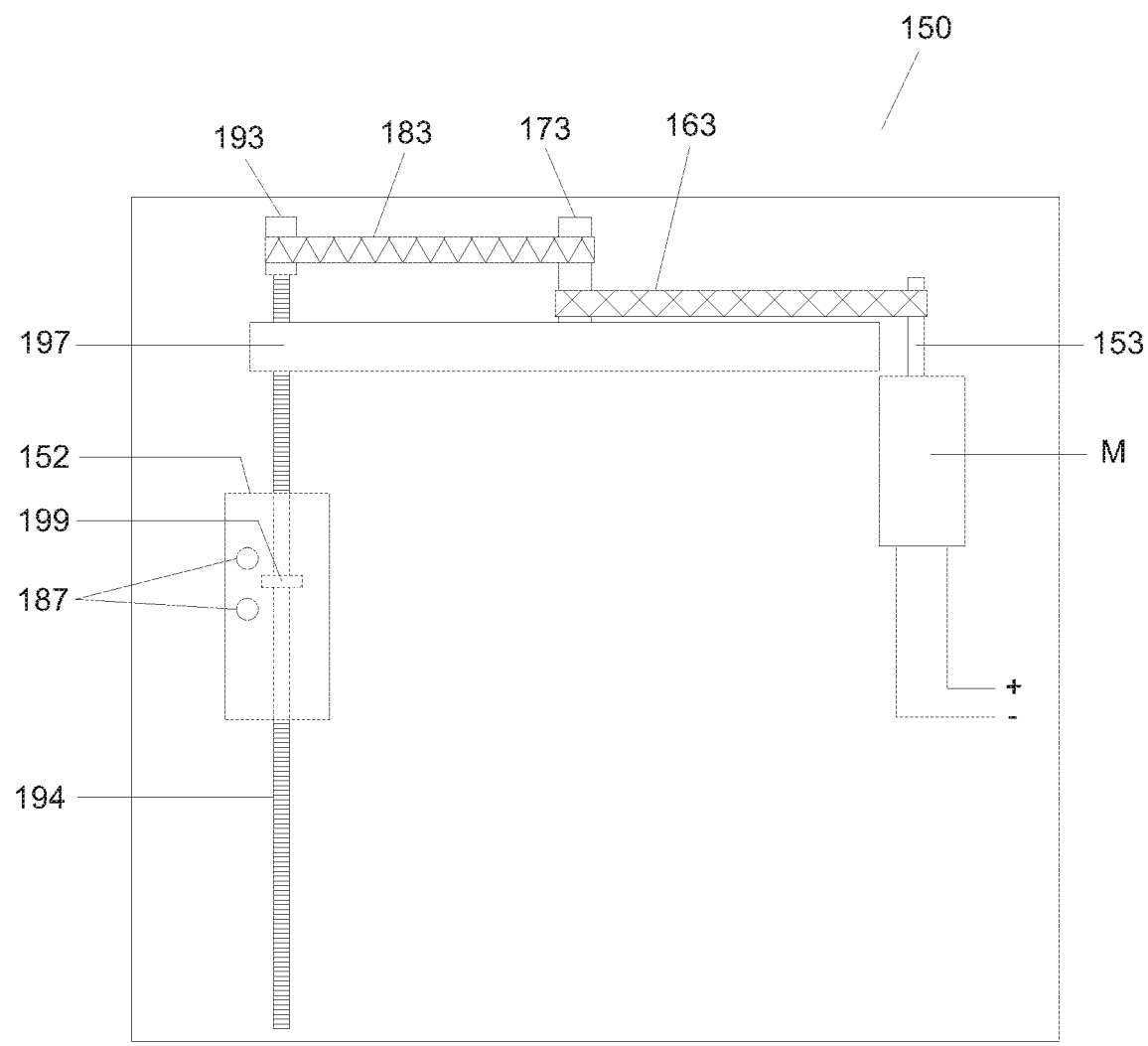
FIG. 13 shows a schematic layout several components forming the position control unit as envisaged in the alternative embodiment.

Further functional aspects of the present embodiment particularly those aspects that deal with the movement of the mounting unit 130 along the elongate slot 140 of the weighing chamber rear wall 125 will be explained in detail with reference to FIGS. 12 and 13. The position control unit 150 is arranged on the second side 136 of the weighing chamber rear wall 125. It is pertinent to note that the position control unit 150 of the present embodiment is motorized and does not require manual operation. The position control unit 150, as shown in FIG. 13, broadly comprises a drive unit M also called as a power unit such as an electrical motor having a drive spindle 153. The position control unit 150 further comprises an intermediate pulley 173, a driven pulley 193, a helical pin 194, carrier 152, and a mounting frame 197. There is also provided a drive belt 163 connecting the drive spindle 153 and the intermediate pulley 173. The intermediate pulley 173 and the driven pulley 193 are connected by a driven belt 183. The driven pulley 193 and the helical pin 194 are integrally formed such that the driven pulley 193 and the helical pin 194 rotate in unison. The drive belt 163, the intermediate pulley 173, the driven belt 183, the driven pulley 193, and the helical pin 194 are supported by the mounting frame 197 that is attached to the second side 136 of the weighing chamber rear wall 125.

The drive unit M provides rotary drive to the drive spindle 153 that in turn is transferred to the intermediate pulley 173 through the drive belt 163. The intermediate pulley 173 in turn transfers rotary motion to the driven pulley 193 through the driven belt 183. As the driven pulley 193 and the helical pin 194 are integrally formed, the driven pulley 193 readily rotates the helical pin 194. The carrier 152 is movably connected to the helical pin 194 such that the rotational movement of the helical pin 194 is converted to translational movement of the carrier 152 along the direction of axis of the helical pin 194. More specifically, a nut 199 integrally connected to the carrier 152 is in a threaded relationship with the helical pin 194. When the helical pin 194 is rotated about its axis, the nut 199 and in turn the carrier 152 tends to move in the normal direction.

Referring once again to FIG. 10, the mounting unit 130 is connected to position control unit 150 through the first arm 154 of carrier 152 by allowing the fastener 189 to pass through the elongate slot 140 and culminate in the threaded bore 187 thereby ensuring that the mounting unit 130 is movably connected to the weighing chamber rear wall 125. Therefore, the rotary drive induced by the drive unit M of the position control unit 150 is transferred over a series of linkages resulting in the movement of mounting unit 130 along the elongate slot 140 provided on the weighing chamber rear wall 125.

In connection with varying the volume of the weighing chamber by moving the top wall 123 of the draft shield 20 in normal direction, a position sensing device (not shown) is provided thereof. The position sensing device (not shown) is in wired or wireless communication with the position control unit 150. Ideally, the position sensing device (not shown) measures the distance to a sample positioned on the weighing pan. The position of the top wall can be adapted according to the measured height. In other applications, an accessory, e.g. a dosing device, can be positioned at the right height to enable spillage free dosing into the sample container. The position sensing device (not shown) senses at least a dimensional parameter, such as height, of the sample container (not shown) received on the weighing pan 16. The position sensing device (not shown) is locatable at one of the advantageous locations on the weighing device 10. Few such advantageous locations are the top wall 123, the mounting unit 130, the weighing chamber rear wall 125, and the weighing chamber floor 15. The position sensing device (not shown) can be one of an optical sensor, sonic sensor, capacitive sensor, or inductive sensor.

Figure 14C:
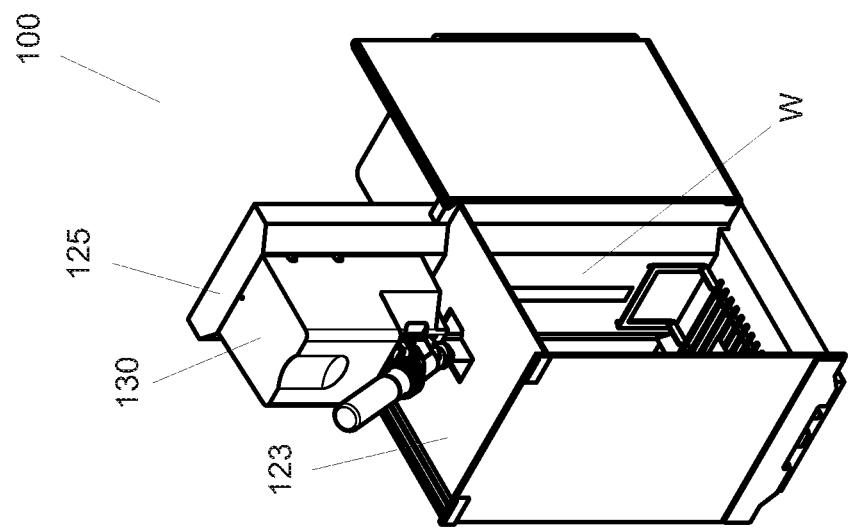
FIG. 14C illustrates the weighing device with its top wall partially disengaged from the mounting unit upon the top wall reaching its upper most position.
Figure 14B:
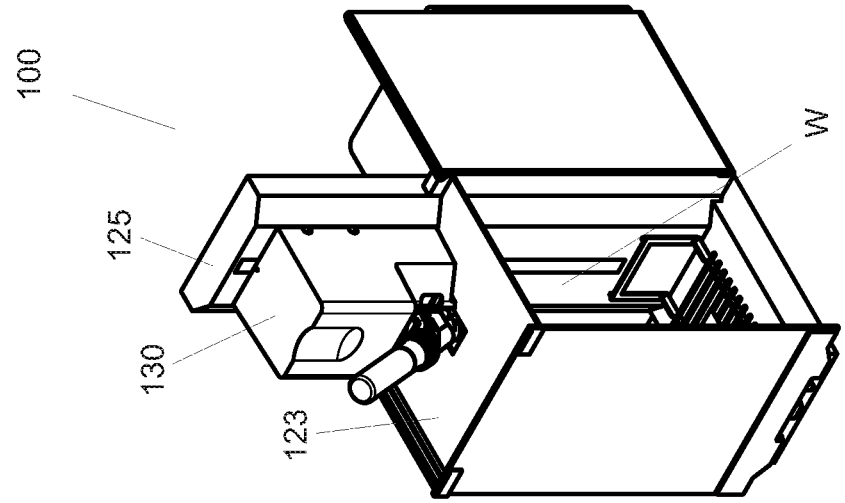
FIG. 14B illustrates the weighing device with its top wall at the upper most position giving rise to the highest possible weighing chamber volume.
Figure 14A:
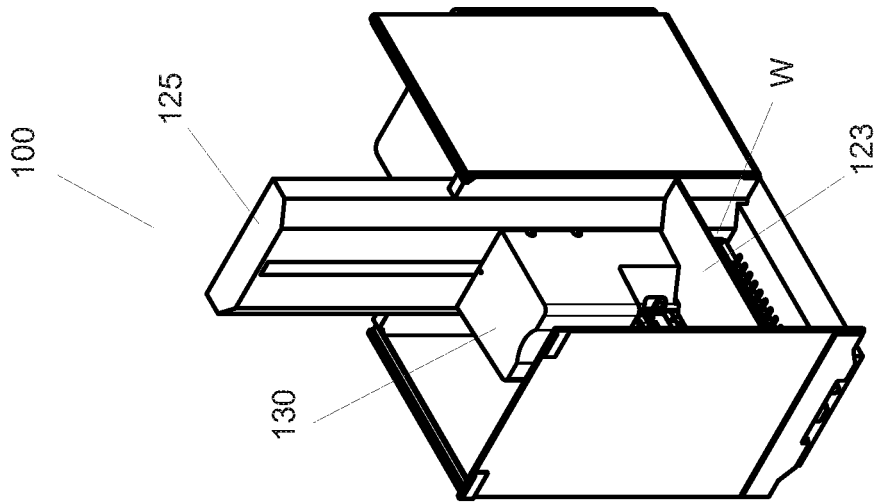
FIG. 14A illustrates the weighing device with its top wall at the lower most position giving rise to the lowest possible weighing chamber volume.

Reference will now be made to FIGS. 14A to 14C, where different positions of the top wall 123 give rise to different volumes of the weighing chamber W. As shown in FIG. 14A, when the mounting unit 130 is actuated to be moved downwards, the volume of the weighing chamber W gradually starts reducing until the top wall 123 reaches a predetermined stop point either defined by the dimensional parameters of the sample container (not shown) as sensed by the sensing device (not shown) or by the length of the elongate slot 140 of the weighing chamber rear wall 125. In FIG. 14B, the mounting unit 130 is actuated for upward movement thereby moving the top wall 123 along the weighing chamber rear wall 125. The top wall 123 reaches a highest point while gradually increasing the volume of the weighing chamber W such that the weighing chamber W registers its highest possible volume. The top wall 123 upon reaching its highest point partially disengages with the mounting unit 130. The mounting unit 130 then advances further up so as to remove the dosing device (not indicated) out of the opening P in the top wall 123.

Certain modifications and improvements in the proposed invention will become readily apparent to a person of ordinary skill in the art. Such changes must be treated as equivalents to the elements of the present invention. Conceivable changes, modifications, and improvements in the claimed invention by the use of substitutes and alternatives in terms of material, method, manufacturing process, configuration, arrangement, duplication etc., will render them fall very well within the scope of the claimed invention.

What is claimed is:

1. A weighing device, comprising:
   a base body;
   a draft shield, having a top wall, a first side wall, a second side wall and a front wall;
   a weighing chamber, defined as an enclosed space by a weighing chamber floor, a weighing chamber rear wall and the draft shield, wherein the weighing chamber rear wall comprises a first side, a second side and an elongate slot, where the first side faces the draft shield, the second side is located opposite the first side, and the elongate slot extends through the rear wall from the first side to the second side;

a mounting unit that is movably connected to the first side of the weighing chamber rear wall; and a position-control unit that is operatively connected to the mounting unit and is located on the second side of the weighing chamber rear wall, with the elongate slot receiving the mounting unit about the first side and guiding the mounting unit in a direction normal to the base body, the position control unit comprising a motor unit that provides necessary motive force to displace the mounting unit in a direction normal to the base body.

2. The weighing device of claim 1, wherein the mounting unit is adapted to receive one or more replaceable accessories selected from the group consisting of: the top wall, dispensing devices, dosing devices, display devices, illuminating devices, sensing devices and ionizer devices.

3. The weighing device of claim 1, further comprising:
a dosing device for dispensing a metered sample through an opening in the top wall.

4. The weighing device of claim 1, wherein the elongate slot is long enough to allow the mounting unit to traverse at least one-third of the length of the weighing chamber rear wall.

5. The weighing device of claim 1, further comprising:
a longitudinal strip that covers the elongate slot.

6. The weighing device of claim 5, wherein the longitudinal strip is tautly secured to the weighing chamber rear wall and the mounting unit is slidably connected to the longitudinal strip, such that the longitudinal strip fully covers the elongate slot at all positions of the mounting unit.

7. The weighing device of claim 1, wherein the top wall is connected to, and located below, the mounting unit, such that the top wall and the mounting unit are movable together along the elongate slot of the weighing chamber rear wall in a direction normal to the base body.

8. The weighing device of claim 1, further comprising:
a weighing pan, located in the weighing chamber, for receiving a sample container; and
a position sensing device attached to the top wall or the mounting unit, configured to sense at least a dimensional parameter, such as a height, of the sample container received on the weighing pan, the position sensing device in communication with the position control unit.

9. The weighing device of claim 1, further comprising:
a clutch element of the position control unit, for applying frictional force on the mounting unit, at a location on the second side of the weighing chamber rear wall, to prevent the mounting unit from freely sliding along the weighing chamber rear wall under gravity.

10. The weighing device of claim 1, wherein the motor unit is located in the weighing chamber rear wall.

* * * * *